United States Patent [19]
Balling

[11] Patent Number: 5,867,745
[45] Date of Patent: Feb. 2, 1999

[54] FILM ROLL CARRIER AND CAMERA

[75] Inventor: Edward Norman Balling, Rochester, N.Y.

[73] Assignee: Eastman Kodak Company, Rochester, N.Y.

[21] Appl. No.: 970,128

[22] Filed: Nov. 13, 1997

Related U.S. Application Data

[62] Division of Ser. No. 567,820, Dec. 6, 1995.

[60] Provisional application No. 60/000,293, Jun. 19, 1995.

[51] Int. Cl.$^6$ .................................................. G03B 17/26
[52] U.S. Cl. ........................ 396/511; 396/538; 242/348.1; 242/520; 242/537
[58] Field of Search ................. 396/6, 319, 415, 396/535, 538, 541, 511, 512; 242/335, 348, 348.1, 520, 537

[56] References Cited

U.S. PATENT DOCUMENTS

| | | | |
|---|---|---|---|
| 1,291,452 | 1/1919 | Farmer | 396/6 X |
| 3,603,235 | 9/1971 | Nelson | 396/395 |
| 3,685,414 | 8/1972 | Good | 396/396 |
| 3,896,467 | 7/1975 | Hamada | 396/401 |
| 3,967,300 | 6/1976 | Oshima | 39/440 |
| 4,440,483 | 4/1984 | Linke et al. | 396/415 |
| 4,884,087 | 11/1989 | Mochida et al. | 354/75 |
| 4,972,649 | 11/1990 | Mochida et al. | 53/430 |
| 5,126,775 | 6/1992 | Nakai et al. | 354/288 |
| 5,136,319 | 8/1992 | Ushiro et al. | 354/114 |
| 5,343,265 | 8/1994 | Oi et al. | 354/222 |

FOREIGN PATENT DOCUMENTS

| | | |
|---|---|---|
| 0 615 153 A1 | 3/1994 | European Pat. Off. . |
| 0 622 662 A2 | 4/1994 | European Pat. Off. . |
| 6-130568 | 5/1994 | Japan . |
| 6-289541 | 10/1994 | Japan . |
| 6-295022 | 10/1994 | Japan . |

*Primary Examiner*—Russell Adams
*Assistant Examiner*—J. K. Han
*Attorney, Agent, or Firm*—Robert Luke Walker

[57] ABSTRACT

A non-lighttight carrier for an unexposed film roll has a body having three closed sides and an open side. The body has at least one open end. The body has a curved inner wall. The body has a plurality of external, longitudinally extending rib members. A convolute, flexible guide member is joined to the body. The guide member is disposed in the open side. The guide member and body define a space for the film roll and a film access slot. A camera has slots that engage the rib members.

10 Claims, 10 Drawing Sheets

FILM ROLL CARRIER AND CAMERA

This is a divisional of application Ser. No. 8/567,820, filed Dec. 6, 1995 claiming priority from Provisional application U.S. Ser. No. 60/000,293 filed Jun. 19, 1995.

FIELD OF THE INVENTION

The invention relates generally to the field of photography, and in particular to apparatus and a related method of preloading film into a prewind type camera. More specifically, the invention relates to a winding fixture for prewinding film from a film cartridge capable of thrusting film into a film roll outside a camera body and a method of prewinding and subsequently loading the film cartridge and the prewound film roll into an open camera body.

BACKGROUND OF THE INVENTION

The so-called single or one time use cameras, have become increasingly popular with the consuming public. These cameras include a lighttight plastic camera body containing a supply of film which is exposed by the consumer. The camera body and the contained film is then returned in its entirety to the photofinisher who removes the film for processing.

It is beneficial in terms of cost and time for the photofinisher to easily remove the film from the camera in normal light conditions, therefore single use cameras are of the prewind type in which a photographic filmstrip, such as from a 35 mm film magazine is first prewound into an unexposed film roll so that the film is advanced back into the lighttight magazine as exposures are taken by the consumer. The lighttight magazine can then be removed by the photofinisher under ambient lighting conditions.

In the normal production of typical single-use or one-time use cameras, such as those manufactured by Eastman Kodak Company and Fuji Film Photo Ltd., among others, the 35 mm film cartridge has a leader portion of a contained filmstrip protruding from the body of the cartridge. This leader portion can then be cinched up to a takeup spool after the remainder of the camera has been completely assembled. The camera is then lighttightly sealed and a winding mechanism, such as a motor, engages an end of the take-up spool in order to prewind the film onto the take-up spool by rotating the spool and thereby pulling the film from the cartridge. This prewinding procedure allows the filmstrip to be assembled into the camera in ambient light. Such a procedure is described in U.S. Pat. No. 4,972,649, among others.

With the advent of so-called "thrust" type (often referred to as APS) film cartridges, however, the procedure of cinching up the leader portion to a takeup spool for prewind or initially for film advance is not required. In the design of this type of cartridge, such as described in U.S. Pat. No. 5,359,378, among others, there is no protruding leader of the contained filmstrip existing outside of the cartridge.

Rather, an active light lock which can selectively be opened or closed maintains the film contained within the cartridge from being fogged by ambient light. To advance the filmstrip out of the cartridge, the active light lock must first be opened which opens a film exit door of the cartridge and permits film to be thrust from the confines of the cartridge by rotation of a film spool contained within the cartridge.

The prewinding of film, therefore, requires the opening of the light lock prior to thrusting the film from the cartridge across the exposure gate and onto a take up spool or roll core which must be accessed in some way to pull the remainder of film from the cartridge. This necessitates a need to prewind film under limited light conditions, that is, in a darkroom. In addition, and though thrust cartridges eliminate the need to manually cinch up the protruding leader, the thrusting mechanism is not intended for the complete prewinding of a filmstrip from a cartridge.

Japanese Kokai 6-130568A entitled: FILM LOADING METHOD FOR THRUST TYPE CARTRIDGES filed Nov. 16, 1992 describes apparatus and a method for prewinding film in a single use camera using a thrust-type cartridge which like conventional single use cameras requires a spool or mandrel to load the film into the film roll chamber. It would be beneficial, however, to provide an effective means for prewinding both thrust and conventional type film cartridges which obviates the need for a take-up spool or other take-up means in the film roll chamber.

SUMMARY OF THE INVENTION

The present invention is directed to overcoming one or more of the problems set forth above. Briefly summarized, according to one aspect of the present invention, a method is provided for prewinding a filmstrip from a film cartridge containing film spool means rotatable in a film unwinding direction to thrust a leader portion of the filmstrip from the cartridge and having light blocking means openable to permit the filmstrip to be thrust from the cartridge, comprising the steps of:

loading the film cartridge into an assembly fixture in a darkroom;

opening the light blocking means;

rotating the film spool means in the film unwinding direction to thrust the leader portion of the filmstrip from the cartridge; and applying at least one roller to the leader portion and rotating the at least one roller to readvance the film from the cartridge into a separate film roll.

According to another advantageous aspect of the present invention, there is provided a method of prewinding a filmstrip from a film cartridge containing film spool means rotatable in a film unwinding direction to thrust a leader portion of the filmstrip from the cartridge and having light blocking means openable to permit the filmstrip to be thrust from the cartridge, comprising the steps of:

loading the film cartridge into an assembly fixture in a darkroom;

opening the light blocking means;

rotating the film spool means in the film unwinding direction to thrust the leader portion of the filmstrip from the cartridge;

applying a set of rollers to the leader portion and rotating the rollers to preadvance the film from the cartridge into a separate film roll; and loading the film cartridge and the film roll into respective chambers of a non-lighttight camera body section.

In a preferred embodiment, the film roll chamber is separately detachable from the camera and can be incorporated into the prewinding assembly fixture so that the film roll can be prewound outside of the camera body and be subsequently loaded into the camera body.

According to another aspect of the present invention, there is provided a film winding fixture comprising respective chambers for receiving a film cartridge and an unexposed film roll, characterized by:

at least one set of rollers between said chambers for engaging a leader portion of a filmstrip protruding from a film cartridge in one of said chambers for moving the filmstrip from the cartridge into the other chamber to form the unexposed film roll.

According to yet another aspect of the present invention, there is provided a camera comprising a body section having at least one opening, characterized by:

a non-lighttight carrier for an unexposed film roll having means defining a film roll chamber having at least one open end arranged to be adjacent to one corresponding end of an unexposed film roll in said chamber.

An advantageous aspect of the present invention is that a method and apparatus are described for the prewinding of a filmstrip from a thrust cartridge into an unexposed film roll and for the loading of the film cartridge and the unexposed film roll, which is easily adaptable to automation.

Another advantageous aspect of the present invention is that the prewound film roll is protected from damage by loading in a limited light situation, by loading by automation, and by not winding the film until the final steps of assembly of the camera.

Another advantage achieved by use of the present invention is that a detachable film roll carrier as described provides a controlled set of molded surfaces for prewinding film which is completely recyclable, thereby saving associated costs.

The described method is simple, easily adaptable to high speed automated production and is economically efficient when compared to existing prewinding and film loading methods.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

The following discussion describes the prewinding of film from a thrust film cartridge into a film roll to be used in conjunction with a single-use camera.

A first embodiment of the present invention is herein described with reference to FIGS. 1–9.

Figure 1:
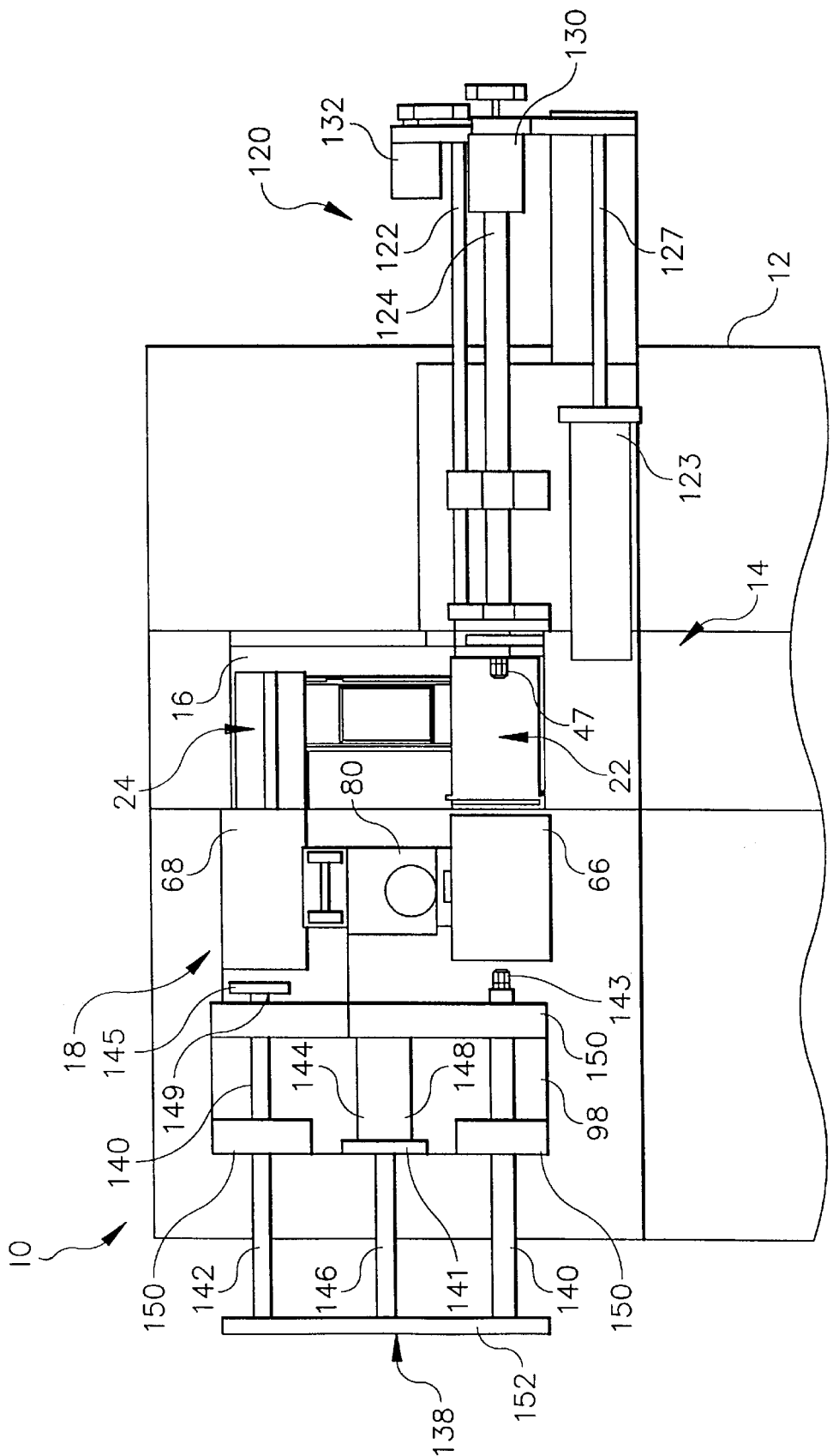
FIG. 1 is a top plan view of an assembly fixture used for loading and prewinding a filmstrip into the camera body of FIGS. 1 and 2 in accordance with a first embodiment of the present invention.

Referring specifically to FIG. 1, an assembly fixture 10 is shown having a base 12, including a slotted portion 14 in which a camera body section 16 can be inserted adjacent a film winding station 18.

Figure 2:
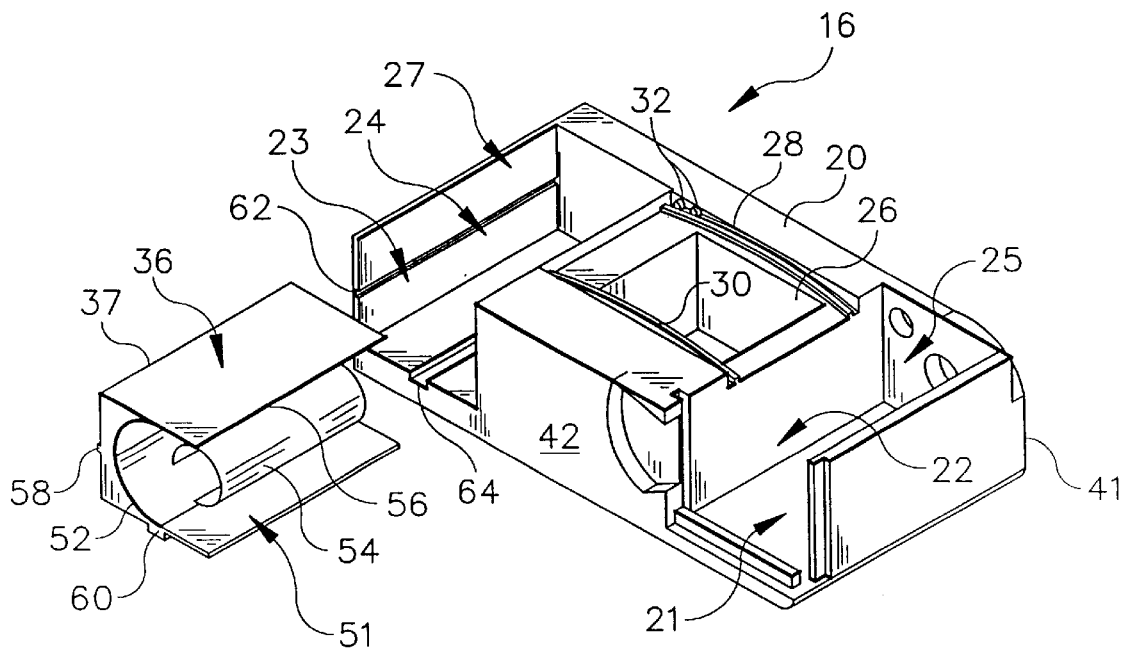
FIG. 2 is a rear perspective view of a camera body section, including a prewind film carrier which can be used in the assembly fixture of FIG. 1.
Figure 4:
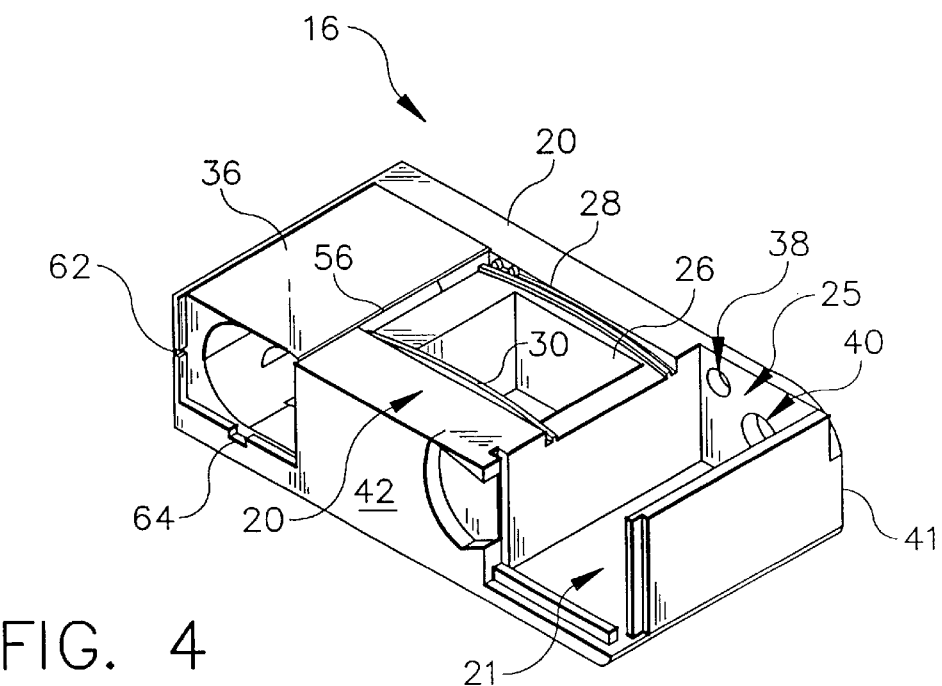
FIG. 4 is the bottom perspective view of the camera body according to FIG. 2, showing the fitting of the prewind film carrier into a corresponding cavity of the camera body.

The camera body section 16, as shown more specifically in FIGS. 2 and 4, comprises a non-lighttight or open rear side 20 including a pair of cavities 22, 24 which are oppositely situated relative to an exposure gate 26. A pair of parallel film rails 28, 30 border the exposure gate 26, as is conventionally known in the field. A pair of adjacent engagement teeth 32 extend from the top film rail 28 for engaging a filmstrip 44, FIG. 8.

Figure 3A:
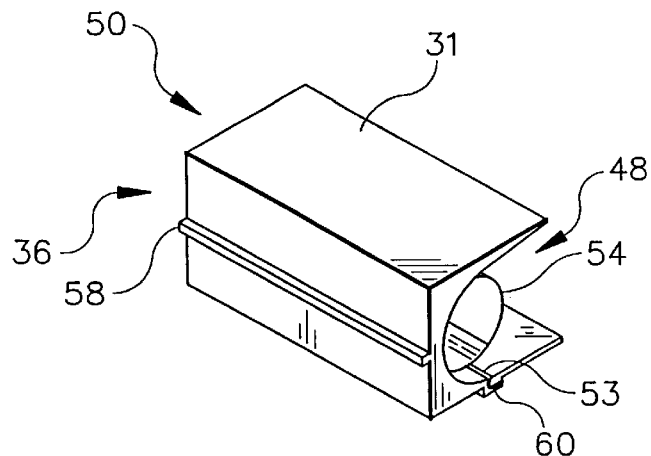
FIGS. 3(a)–3(b) are perspective views of the film roll carrier shown in FIGS. 2 and 3 illustrating the assembly of a guide member for defining a film roll.
Figure 3B:
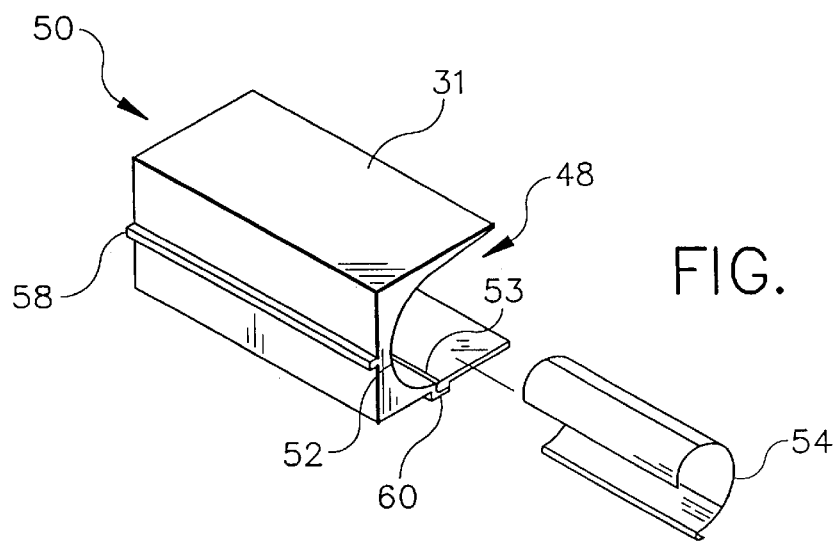
Figure 3C:
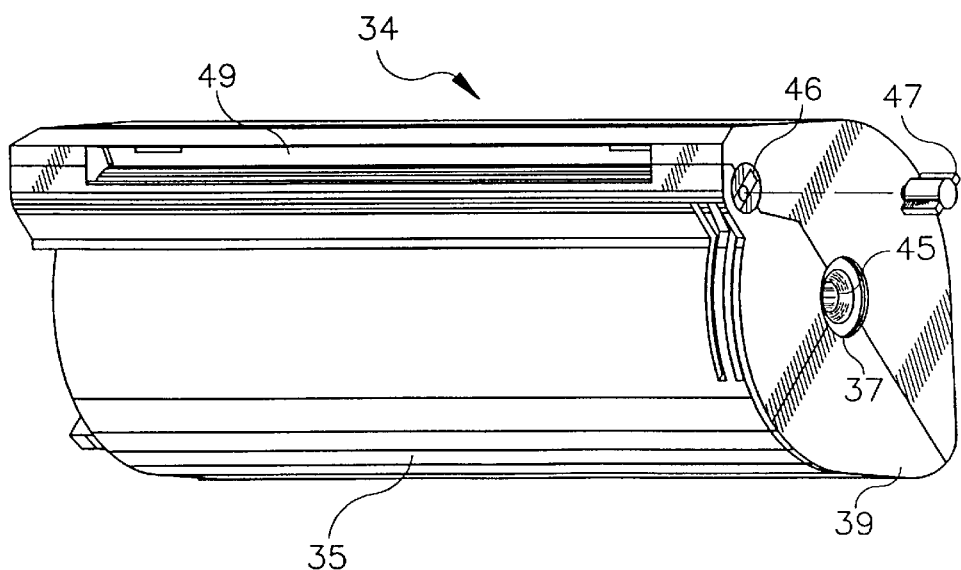
FIG. 3(c) is a perspective view of a film cartridge used in accordance with the present invention.

The cavities 22, 24 are sized to receive a film cartridge 34, FIG. 3(c), and a film roll carrier 36, respectively, each having an open end 21, 23 and an open side 25, 27 in the bottom and rear sides 42, 20, respectively, of the camera body section 16. The cavity 22 includes a pair of holes 38, 40 in a top surface 41 for accessing a film cartridge 34 inserted into the cavity according to the description which follows.

Figure 8:
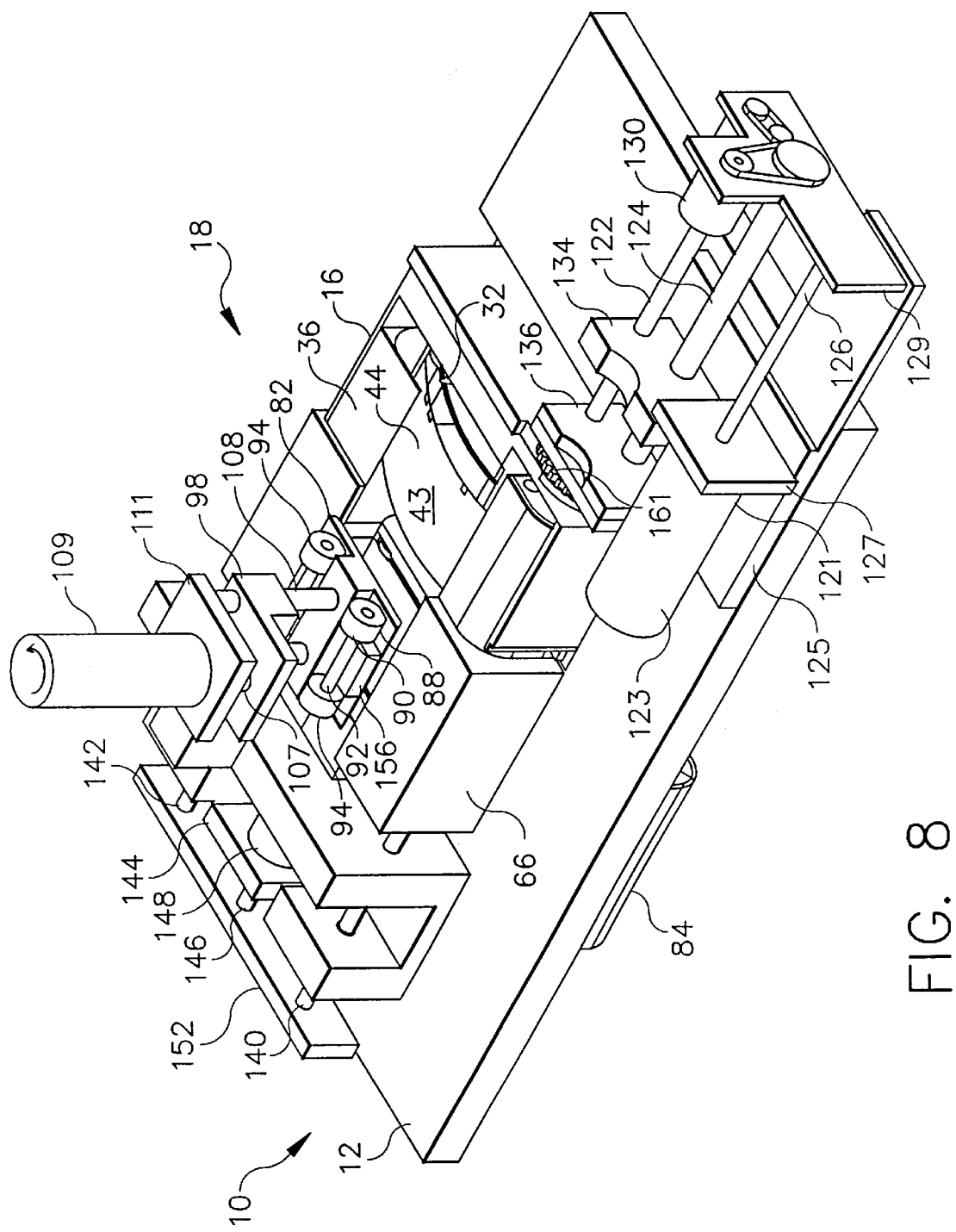
FIG. 8 is a partial top perspective view of the assembly fixture shown in FIG. 9, showing the loading of the cartridge and film prewind carrier into an open camera body.

Referring now to FIG. 3(c), the film cartridge 34 includes a lighttight body portion 35 having an interior rotatable film spool 45, as well as an active light lock 46 which opens by means of a rotatable drive mechanism (the engaging end 47 of a rotatable drive shaft is partially shown in FIG. 3(c)), to open a film exit door 49, permitting a contained filmstrip 44, shown in FIG. 8, having a leader portion 43, also shown in FIG. 8, to be thrust from the film cartridge 34 after the rotatable spool 45 is rotated in a film unwinding direction. The film spool 45 includes an external drive access 37 which is accessible along with the light lock 46 from one side or end 39 of the film cartridge 34. Such a thrusting type of film cartridge having an openable light lock is described in greater detail in U.S. Pat. No. 5,359,378, issued Oct. 25, 1994, which is hereby incorporated by reference.

Referring to FIGS. 2–4, the film roll carrier 36 includes a body 31 having three closed sides, a pair of open ends 48, 50, and an open side 51. A flexible plastic film-wrap control or guide member 54 is provided having a convolute surface profile which is inserted into a slot 53 of an inner curved wall 52 of the carrier 36 and defines a film access slot 56 in the open side 51. A pair of external and longitudinally extending rib members 58, 60 are provided on two of the closed sides of the carrier 36 for engaging a corresponding pair of slots 62, 64 in the side and bottom interior walls of the cavity 24 to allow the carrier 36 to be axially loaded into the camera body section 16 through the open end 23 of the bottom surface 42.

Referring now to FIGS. 5–8, the assembly fixture 10, and more specifically the film winding station 18 will be described in greater detail.

A pair of chambers 66, 68 are provided and extend from a top surface of the assembly fixture base 12, each chamber having a bottom slotted portion 70, 72 to allow respective loading of a film cartridge 34, such as previously described, FIG. 3(c), and a film roll carrier 36. Each of the chambers 66, 68 include a pair of open ends 74, 76. Preferably, the spacing between the two chambers 66, 68 is equivalent to the spacing between the cavities 22, 24 of a camera body section 16, for reasons which will be apparent below.

Between the chambers 66, 68 at the film winding station 18 is a film transport assembly 80 comprising upper and lower roller assemblies 82 and 84. The upper roller assembly 82 comprises a horizontally disposed plate 86 having a pair of oppositely situated openings 88. Each of the openings 88 are sized for receiving an engaging portion of a nip roller 90. The rollers 90 are joined to define oppositely situated roller pairs 94 on either side of the plate 86. The engaging portion of each of the nip rollers 90 extend through the openings 88 in the plate 86 while the plate supports each of the axles 92.

The upper roller assembly 82 also includes a sensor element 156, such as an LED, which is attached to the horizontal plate 86 in a position adjacent the cartridge chamber 66 for sensing the presence of a thrusted filmstrip 44, FIG. 8, as described in greater detail below.

The adjacent lower roller assembly 84 is similarly constructed to include a horizontal plate 96, also having a set of openings (not shown) to accommodate the engaging portions of two matching pairs of rollers 100. Each of the roller pairs 100 comprise two nip rollers 102 which are similarly coined by axles (not shown). When the roller pairs 94, 100 are brought into contact with one another, a passage or gap 104 is defined between the horizontal plates 86, 96 which is sufficiently wide to permit a filmstrip 44 to pass therethrough. The horizontal plates 86, 96 are substantially parallel, while the nip rollers 90, 102 are arranged in a direction which is parallel to the film path between the two chambers 66, 68; that is, the axles 92 are perpendicular to the film path. In addition, the rollers 90, 102 of each roller pair 94, 100 are approximately spaced a distance which is substantially equivalent to the spacing between the film rails 28, 30 of a camera body section 16 and are preferably each have widths equivalent to the width of a film rail in order that the engaging portion of the rollers contact only the edges of a passing filmstrip 44, and not the image capture area of the filmstrip.

A motor 85 (shown schematically for the sake of clarity in FIG. 5 only) is interconnected to each of the axles (not shown) of the lower roller assembly 84 to provide rotation of the roller pairs 100 in a film unwinding direction, in a manner conventionally known.

The lower roller assembly 84 is stationarily disposed above the assembly base 12 by a support member 98 which extends from the base 12 so that the top surface of the horizontal plate 96 is substantially coplanar with the film exit door 49 of a film cartridge 34 which is loaded into the chamber 66, as well as with the film access slot 56 of a film roll carrier inserted in the chamber 68. The top surface of the horizontal plate 96 also supports an advancing filmstrip 44 between the cartridge chamber 66 and the film roll carrier chamber 68, as described below in greater detail.

The upper roller assembly 82, however, can be preferably movable in a vertical direction into and out of engagement with the lower roller assembly 84 by means of a drive actuator 106, comprising a drive cylinder 109 which can be an air cylinder or other actuator means having an interior sized for containing an attached rigid drive shaft 107 which can be drawn into and out of the interior when the cylinder is rotated. Such actuator means are commonly known in the field and form no inventive part of the present invention.

The drive cylinder 109 is secured to an actuator base 111 which is supported by an L-shaped bracket portion 112 of the support member 98 disposed directly above the film winding station 18. A pair of spaced output shafts 108 are also secured at one end to the actuator base 111, and extend downwardly from the base through holes in the bracket 112, and are secured to the horizontal plate 86 of the upper roller assembly 82.

When rotated in a clockwise direction, the drive cylinder 109 bears against the actuator base 111 and pushes the drive shaft 107 from the interior of the cylinder, as is known. The extending end of the drive shaft 107 bears against the top surface of the bracket 112, causing the actuator base 111 to be translated vertically upward away from the stationary and fixed bracket 112 as the drive shaft 107 is driven from the confines of the cylinder. The movement of the actuator base 111 also causes the secured spaced output shafts 108 to translate the attached upper roller assembly 82 out of engagement with the lower roller assembly 84; see FIG. 8 showing the retracted position.

It should be readily apparent from the preceding discussion that other types of actuator assemblies, such as motorized translation stages and the like, can also be used to drive either the upper or lower roller assembly into and out of engagement with the other roller assembly.

The upper roller assembly 82 is aligned relative to the lower roller assembly 84 so that the engaging portions of the corresponding nip roller pairs 94, 100 can be brought into contact with one another. When the upper roller assembly 82 is brought into engagement with the lower roller assembly 84 by the actuator 106, each of the engaging nip roller pairs 94, 100 can be driven in a film advancing direction by the motor 85, FIG. 5.

A cartridge engagement mechanism 120 adjacent to the film winding station 18 and directly adjacent to the slotted portion 14 of the assembly base 12 includes an engagement actuator 121, which like the drive actuator 106 includes an engagement cylinder 123 having an interior sized for containing a rigid and attached drive shaft 126 which can be drawn into and out of the interior when the cylinder is rotated, in a known manner.

The engagement cylinder 123 is secured to an actuator base 127 which is secured at one edge to a planar support member 125, attached to the assembly base 12. The drive shaft 126 is attached at its remaining end to a translatable drive plate 129. A pair of parallel output shafts 122, 124 also attached to the drive plate 129 horizontally extend from the plate 129 toward the chamber 66 through holes defined in supports 134, 136 extending up from the planar support member 125. The shafts 122, 124 have ends 47, FIGS. 1, 3(c), for engaging the light lock 46 and film spool 45 of a film cartridge 34 loaded into the chamber 66, as described in greater detail below.

A pair of motors 130, 132 are also attached to the translatable drive plate 129. Each motor 130, 132 includes an output shaft (not shown) which extends through the drive plate 129 and is connected at one end to a pinion 128, 131.

Corresponding pinions 133, 137 are attached to the end of the output engaging shafts 122, 124. Separate drive belts 135 interconnect the pinions 128, 133 and 131, 137, respectively, to define drive mechanisms capable of rotating the shafts 122, 124 in a particular manner to therefore permit drive engagement with the light lock 46 and cartridge film spool 45, respectively, of a film cartridge 34. In addition, the planar support member 125 includes a cutout portion creating a stop edge 139 for limiting the horizontal travel of the translatable drive plate 129. The details of each of these features is described in greater detail in the operation sequence below.

Best seen in FIG. 1, and oppositely disposed from the cartridge engagement mechanism 120, relative to the film winding station 18, is a loading and positioning mechanism 138 mounted to the support member 98 and secured to the top surface of the assembly base 12. The mechanism 138 includes a loading actuator 144, similar to those previously described above, including a drive shaft 146 attached to a drive cylinder 148. The actuator 144 includes a base 141 which is attached to the support member 98 in a manner which allows the drive shaft 146 to horizontally translate when the drive cylinder 148 is rotated, as is commonly known. The remaining end of the actuator drive shaft 146 is securely attached to a movable plate 152 which translates horizontally along the support member 98 in response to the rotation of the cylinder 148. A pair of parallel, horizontal loading shafts 140, 142 are each also secured at one end to the drive plate 152 and include engaging ends 143, 149 for simultaneously loading a film cartridge 34 and a film roll carrier 36 having a prewound film roll into a camera body section 16 positioned in the slotted portion 14 of the base 12 from chambers 66, 68 of the prewind film station 18. The cartridge and carrier loading shafts 140, 142, and the actuator loading shaft 146 are parallel to one another and translate as a unit along with the movable plate 152 as described in greater detail below. The shafts 140, 142 are supported by corresponding supports 150, extending from the support member 98 through defined openings (not shown) through which the shafts pass.

Connected to the unsecured end 149 of the film roll carrier loading shaft 142 is a loading contact plate 145, FIG. 1, which is sized to provide contact against the body 37 of the film roll carrier 36 when guiding the carrier into a camera body section 16, as described in greater detail below.

The above described assembly fixture 10 allows an unexposed photographic filmstrip 44, FIG. 8, contained within a film cartridge 34 to be prewound into a film roll carrier 36 by means of the film transport mechanism 80. This form of film prewinding is especially important in so-called single-use or "one-time use" cameras in which unexposed film is sequentially advanced as exposures are taken, thereby moving the film from the unexposed film roll back into the film cartridge 34. When all of the exposures have been taken, the film cartridge 34 can be unloaded by the photofinisher for processing, rather than requiring the user or the photofinisher first rewind film back into the film cartridge.

In the present invention, the film cartridge 34 and the film roll carrier 36 containing an unexposed film roll can be loaded together simultaneously into the respective cavities 20, 22 of a camera body section 16 to facilitate assembly of the camera.

Figure 5:
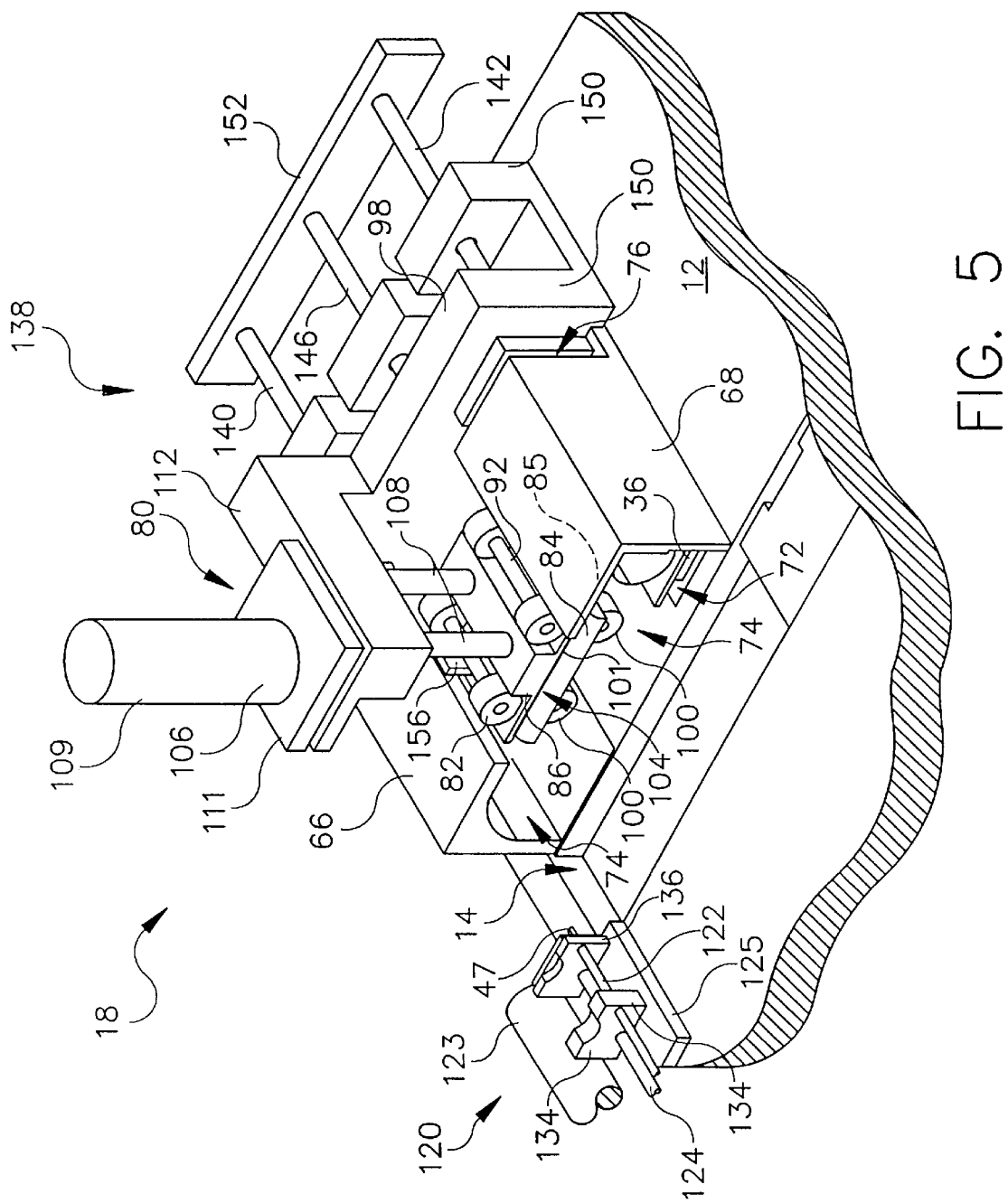
FIG. 5 is a partial top perspective view of the assembly fixture of FIG. 1, showing a nip roller assembly for guiding film into the prewind film carrier.
Figure 6:
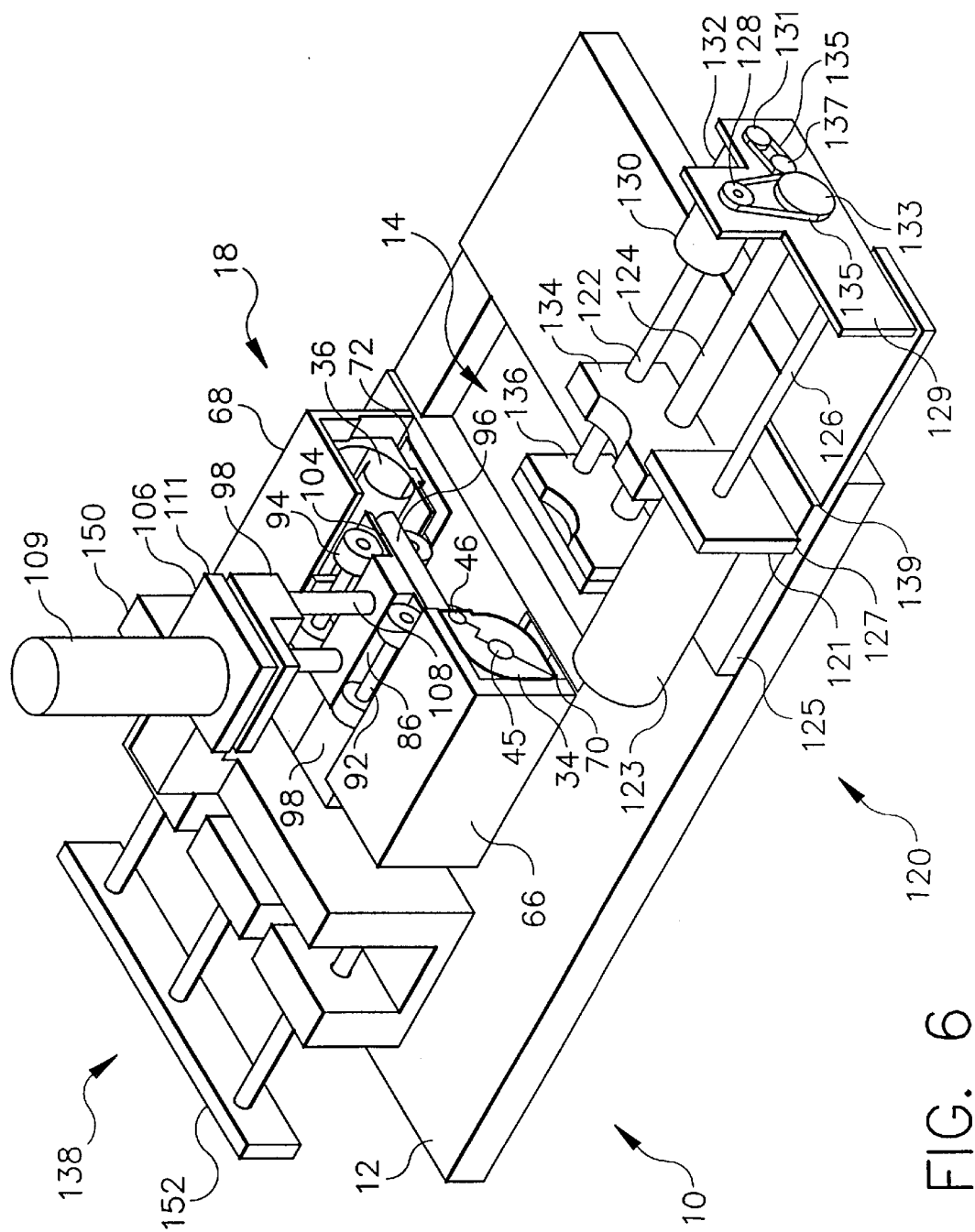
FIG. 6 is a perspective view of the assembly fixture of FIG. 5, showing a film cartridge and a film roll carrier positioned in the fixture relative to the roller assembly.

Operation
1. Loading Film Cartridge and Film Roll Carrier Into Film Prewinding Station An assembly operation using the fixture 10 will now be described. Referring to FIGS. 5 and 6, a thrust-type film cartridge 34 and a film roll carrier 36 are first positioned within the chambers 66, 68, respectively of the winding station 18. The film cartridge 34 can be loaded directly into position within the chamber 66 from the underside of the base 12 through the slotted portion 70 by a cartridge supply (not shown). The film cartridge 34 is aligned within the chamber 66 so that the light lock 46 and rotatable film spool drive access 37 side 39 of the cartridge is positioned at the open end 74 of the chamber, aligning the cartridge end 39, FIG. 3(c) with the cartridge engagement mechanism 120, and with the film exit door 49, FIG. 3(c) facing the open side of the chamber.

The film roll carrier 36 is similarly loaded into the carrier chamber 68 of the film winding station 18 through the slotted portion 72 of the base 12 located on the underside of the chamber 68 by any convenient manual or automatic conveying means. The open side 51 of the film roll carrier 36 is aligned with the open side of the chamber 68 with the film access slot 56 being positioned adjacent the roller assembly 84.

2. Film Prewinding

Figure 7:
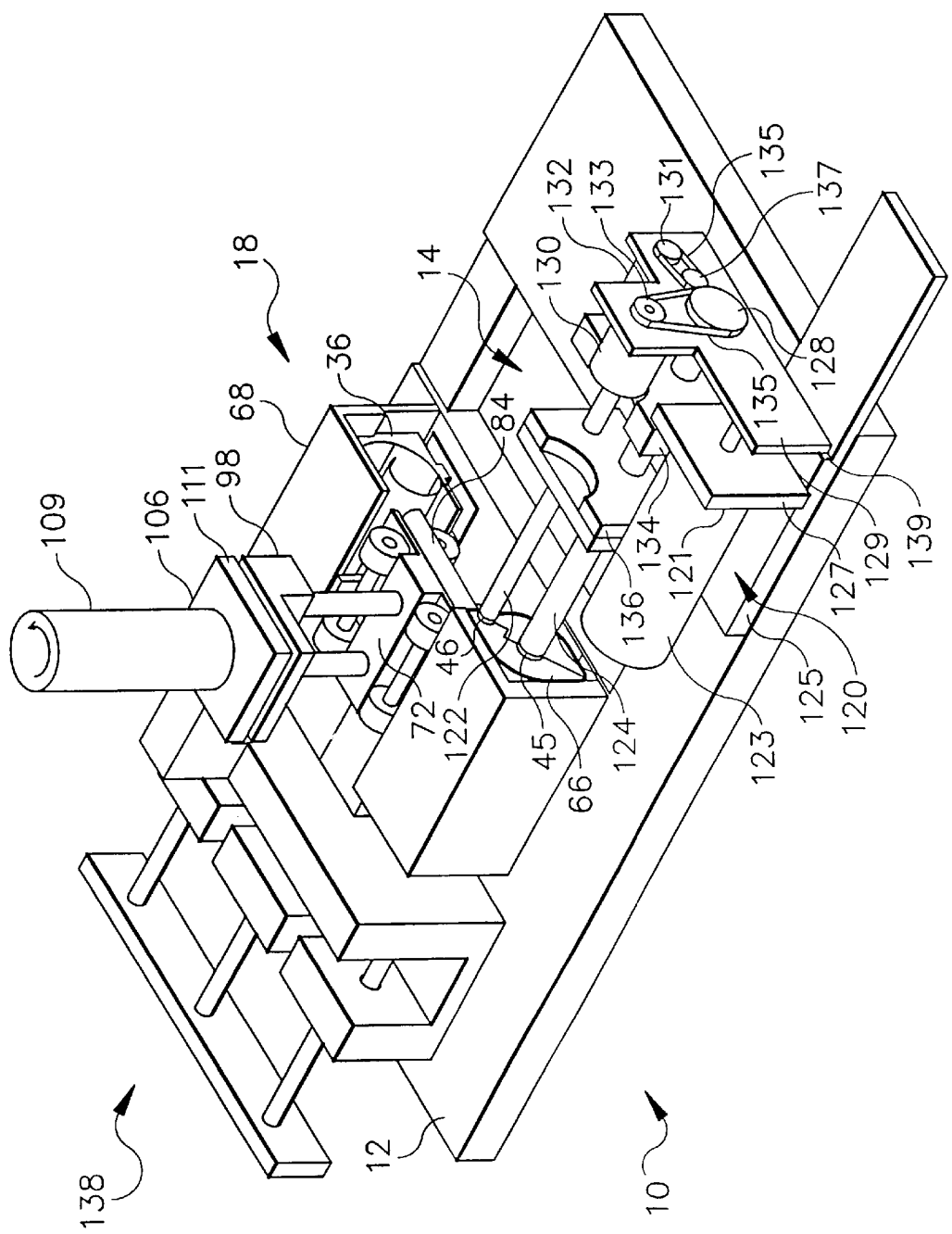
FIG. 7 is the top perspective view of the assembly showing an engagement with the loaded film cartridge to open the light blocking door and to rotate the film spool of the cartridge to thrust film outward of the cartridge.

Referring now to FIGS. 6 and 7, a film prewinding operation is herein described. Either immediately prior to or after the film cartridge 34 and the film roll carrier 36 have been loaded into the respective chambers 66, 68 of the film winding station 18, the film transport mechanism 80 is activated by rotating the drive cylinder 109 of the drive actuator 106 in a clockwise direction. This rotation draws the drive shaft 107, FIG. 8, into the confines of the cylinder interior and translates the actuator base 111 towards the support bracket 112. The translation of the actuator base 112 causes the secured output shafts 108 and the attached upper roller assembly 82 to also be translated vertically downward towards the lower roller assembly 84 until the engaging portions of the roller pairs 94, 100 are brought into contact with one another. FIGS. 6 and 7 illustrate the roller assemblies 82, 84 already in an engaged position.

After the thrusting film cartridge 34 is axially positioned in the cartridge chamber 66 of the film winding station 18, the engaging shafts 122 and 124 of the cartridge engagement mechanism 120 are brought into engagement with the light lock 46 and the cartridge film spool 45 of the loaded film cartridge 34, respectively. This is accomplished by rotating the engagement cylinder 123 of the engagement actuator 126 in a counterclockwise direction, drawing the drive shaft 126 into the confines of the cylinder. Because the end of the drive shaft 126 is securely attached to the translatable drive plate 129, and the actuator base 121 is secured to the planar support member 125, the drive plate 129 is also translated horizontally towards the drive cylinder 123. The attached engaging shafts 122, 124 due to their attachment to the drive plate 129 are therefore translated towards the cartridge chamber 66 and across the slotted portion 14 until the engaging ends 47, FIGS. 1, 3(c), of each shaft 122, 124 engage with the light lock 46 and the cartridge film spool drive access 37, respectively.

Simultaneously, the cartridge loading shaft 140 of the positioning and loading mechanism 138 is also brought into engagement with the film cartridge 34 by rotating the loading drive cylinder 148 in a counterclockwise direction translating the movable plate 152 and cartridge loading shaft 140 until the engaging end 143, FIG. 1, interfaces with the spool drive of the film cartridge. This mechanism engagement supports the cartridge 34 to prevent the cartridge 34 from being displaced out of the chamber 66 during film prewinding.

Referring to FIG. 7, and after the engaging end 47 has been translated into engagement with the light lock 46 of the film cartridge 34, the light lock opening shaft 122 is rotated in a clockwise direction, according to this embodiment, by activating the light lock opening motor 132 which, due to the belt drive engagement of pinions 131 and 137, rotates the opening shaft 122 in a clockwise direction by a half revolution and opening the film exit door 49, FIG. 3(c).

Once the light lock 46 has been opened, in a darkroom as described above, the cartridge spool engaging shaft 124, having its engaging end 47, FIG. 1, engaged with the drive access 37, FIG. 3(c), of the cartridge 34, can be rotated to produce drive engagement to thrust the filmstrip 44, FIG. 8, through the film exit door 49, FIG. 3(c), of the cartridge by activating the thrust motor 132 which rotates the shaft 124 in a clockwise direction to rotate the cartridge film spool 45 in a film unwinding direction and to thrust the leading portion 43, FIG. 8, of the contained filmstrip 44, FIG. 8, out of the cartridge 34 through the film exit slot 49, FIG. 3(c). The leader portion 43, FIG. 8, of the filmstrip 44, FIG. 8, is then advanced through the film exit door 49, FIG. 3(c), and into the film transport plane where the filmstrip 44, FIG. 8, is sensed by the sensor 156, conveniently positioned on the upper roller assembly 82 to sense the presence of the leader portion 43. The sensing of the leader portion 43 by the sensor causes a signal to be sent to a controller (not shown) which activates the drive motor 85, FIG. 5, of the lower roller assembly 84, driving the nip rollers 102, 94, and advancing the filmstrip 44 from the cartridge 34 towards the film roll carrier 36.

During film advancement in the prewind direction, the edges of the filmstrip 44 are engaged by the nip rollers 90, 102, the filmstrip 44 is advanced through the gap 104 created between the upper and lower roller assemblies 82, 84 and guided through the gap 104 by the nip rollers 100 which are rotated in a counterclockwise direction toward the film roll carrier 36.

The guided filmstrip 44 thereafter enters the other chamber 68, and more specifically the film roll carrier 36 through the film access slot 56 in the open side 51 of the carrier. The end of the filmstrip 44 contacts the curved inner wall 52 of the carrier and is caused to define an unexposed cylindrical film roll due to the coordination of the inner surfaces of the film roll control member 54 and the curved inner wall 52, respectively. The open ends 48, 50 of the film roll carrier 36 are arranged to be adjacent to the corresponding ends of the unexposed film roll which is formed.

Preferably, once the filmstrip 44 has been taken up by the roller pairs 94, 100 and the film transport mechanism 80 is pulling the filmstrip from the film cartridge 34, the controller (not shown) or other control device deactivates the thrust motor 132 to stop the rotation of the cartridge spool engaging shaft 124. The engaging shaft 124, however, can also be allowed to operate even after the rollers 90, 102 begin pulling film from the cartridge 34.

It is known that the trailing end (not shown) of the filmstrip 44 remains attached to the cartridge film spool to allow film to be advanced back into the cartridge 34 during image capture. Prewinding continues until the exposure frames of the filmstrip 44 have been removed from the cartridge 34 and wound into the film roll carrier 36. The sensor element 156 can be positioned to detect an end of roll perforation or other demarcation(not shown) of the filmstrip 44. Upon sensing the end of film perforation, the sensor element sends a signal to the controller or other control device (not shown) and deactivates the drive motor 85. Alternately, a timer (not shown) or other known means can be used to sense the end of the prewinding operation after a predetermined time sufficient to ensure the filmstrip 44 has been fully withdrawn from the cartridge 34.

Referring to FIG. 8, the upper roller assembly 82 is then retracted out of engagement with the lower roller assembly 84 and the filmstrip 44 by the drive actuator 106 as the drive cylinder 109 is rotated oppositely (according to the conventions shown in a counterclockwise direction).

Upon the completion of film prewind, the cartridge spool engaging shaft 122 and the active light lock opening shaft 124 are also retracted out of engagement with the film cartridge 34 by reversing the travel of the actuator 126, by oppositely rotating the drive cylinder 128 in a clockwise direction. The cartridge loading shaft 140 remains engaged with the cartridge film spool 45.

3. Loading Film Cartridge and Film Roll Carrier

Referring now to FIG. 8, a camera body section 16 is loaded on the assembly fixture 10, with the open rear side 20 facing upwardly. The body section 16 can be positioned from the underside of the fixture base 12 through the slotted portion 14 so that the open ends 21, 23 of cavities 22, 24 are aligned with the open ends 74, FIG. 5, of chambers 66, 68.

With the upper roller assembly 82 remaining in the retracted position, the drive cylinder 148 of the loading actuator 144 is rotated counterclockwise, drawing the drive shaft 146 further into the interior of the cylinder 148. The horizontal translation of the shaft 146, which is securely mounted to the movable plate 152 therefore also translates the movable plate, as well as the attached cartridge loading shaft 140 which is still engaged with the filmspool 45 of the cartridge 34 and the film roll carrier loading shaft 142, in contact with the film roll carrier 36 by means of contact surface 145. Each of the shafts 140, 142 are axially driven through the holes (not shown) in the supports 134, 136 pushing the film cartridge 34 and the film roll carrier 36, respectively through the open end 74 of the chambers 66, 68 and into the cavities 22, 24 of the camera body section 16 which are aligned with the chambers through the open ends 21, 23 in the bottom surface 42. As the film cartridge 34 slides into place in the cartridge cavity 22 of the camera body section 16, a drive engagement portion (not shown) of an attached thumbwheel 161 within the cavity 22 positioned through hole 40 in the top surface 41 aligns with the drive access 37 of the film cartridge 34.

The film roll carrier 36 fits in the camera body section 16 as previously illustrated in FIGS. 3(a) and 3(b) by aligning the molded-in features (slots 62, 64) of the cavity 24 with the ribs 58, 60 of the carrier 36 while the filmstrip 44 attached to the film roll carrier 36 and the film cartridge 34 is supported at its edges by the parallel sets of film rails 28, 30.

4. Fixing Rear Cover to Camera Body

Figure 9:
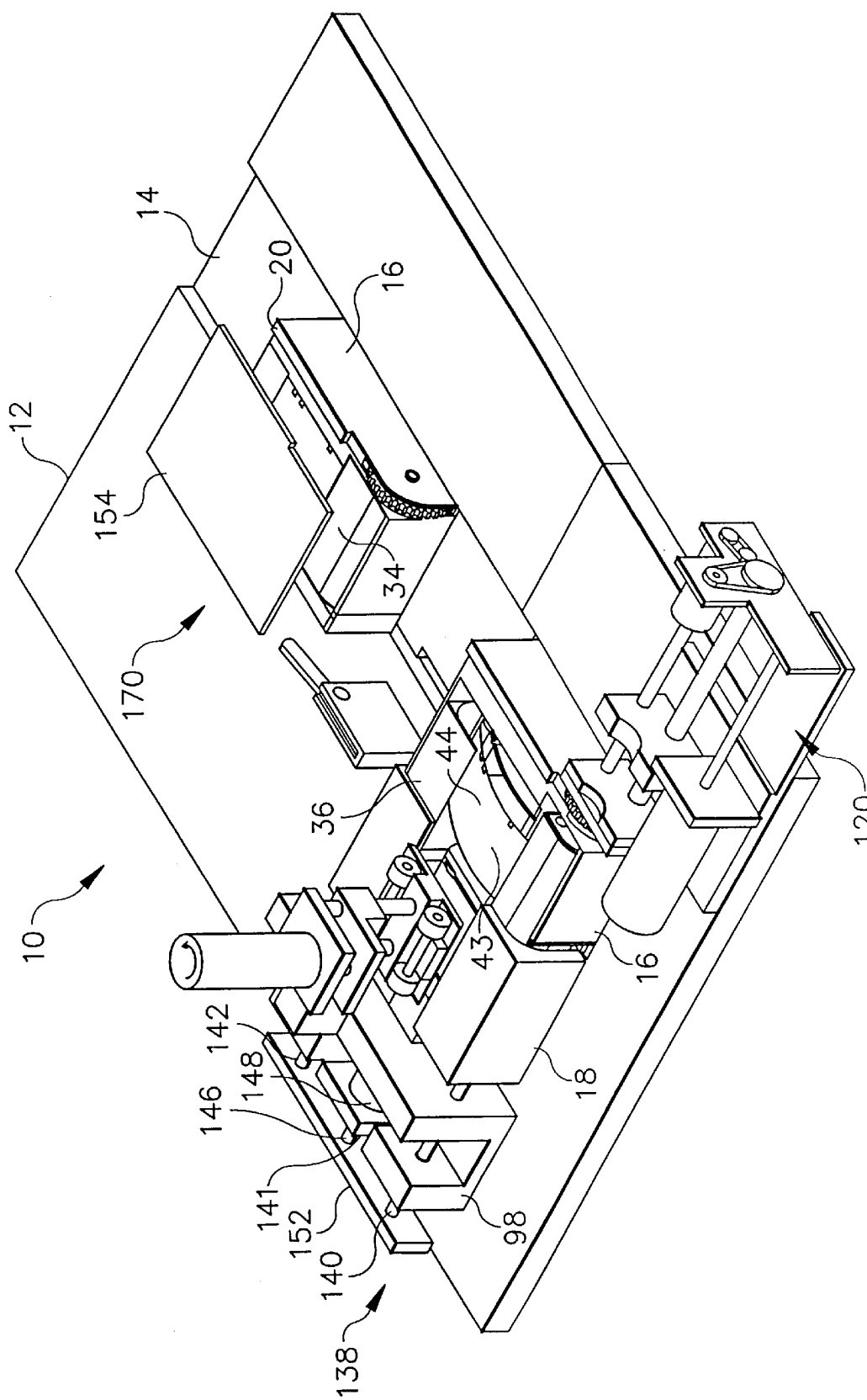
FIG. 9 is a top perspective view of the assembly fixture of FIG. 10, showing the fixing of a lighttight cover to the camera body section.

Referring now to FIG. 9, and after the film cartridge 34 and the film roll carrier 36 have been loaded into the respective cavities 22, 24, the camera body section 16 is relocated along the slotted portion 14 to an adjacent assembly station 170 of the assembly fixture 10 where a lighttight rear cover 154 is fixed to the open rear side 20, such as by ultrasonic welding, snap engagement, or other suitable attachment means to make the camera light tight. Such means are commonly known in the field, such as those described in U.S. Pat. Nos. 5,126,775 and 5,146,255, among others.

Second Embodiment of the Present Invention

Figure 10:
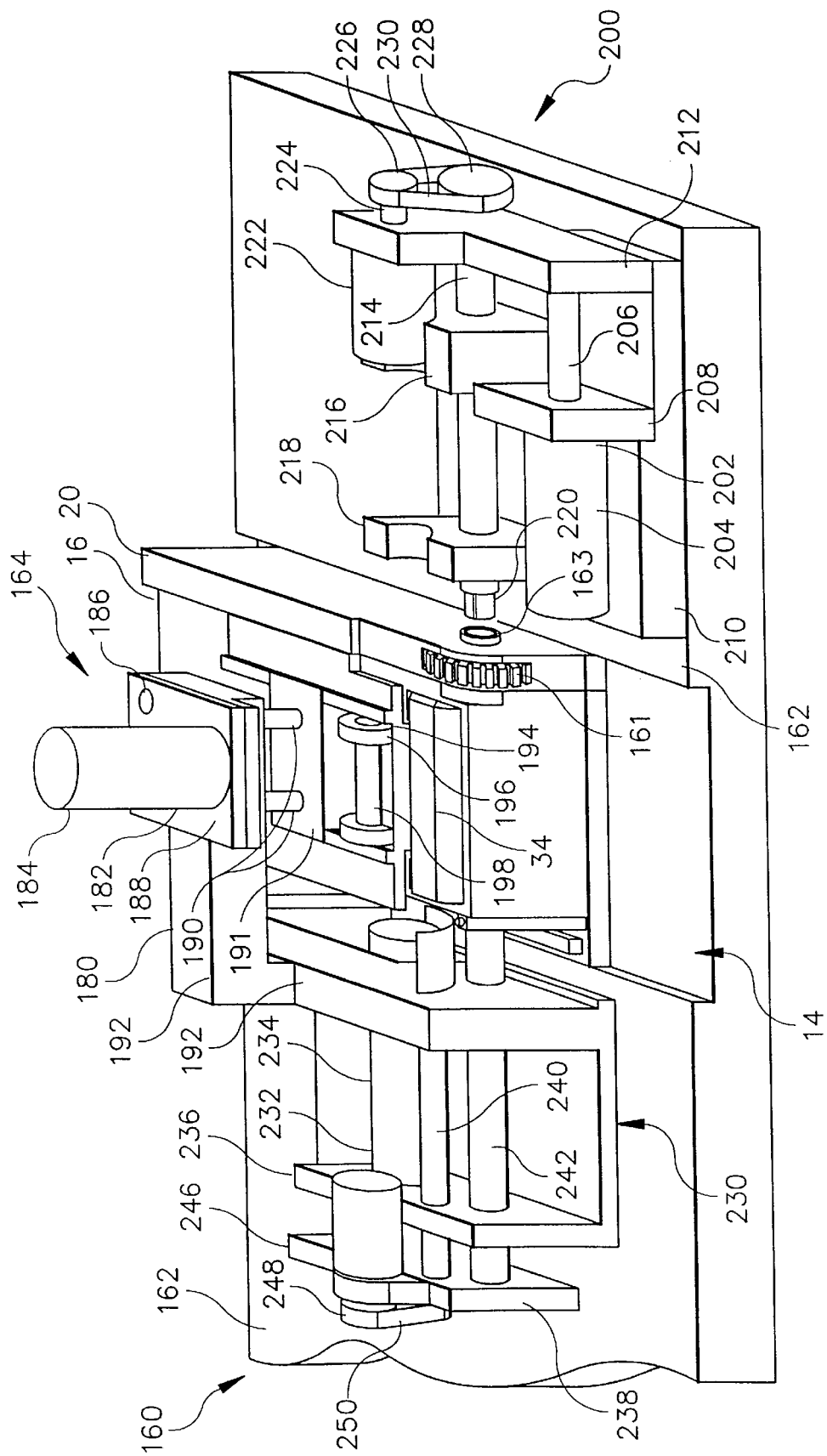
FIG. 10 is a partial elevational view of an assembly fixture according to a second embodiment of the present invention.
Figure 11:
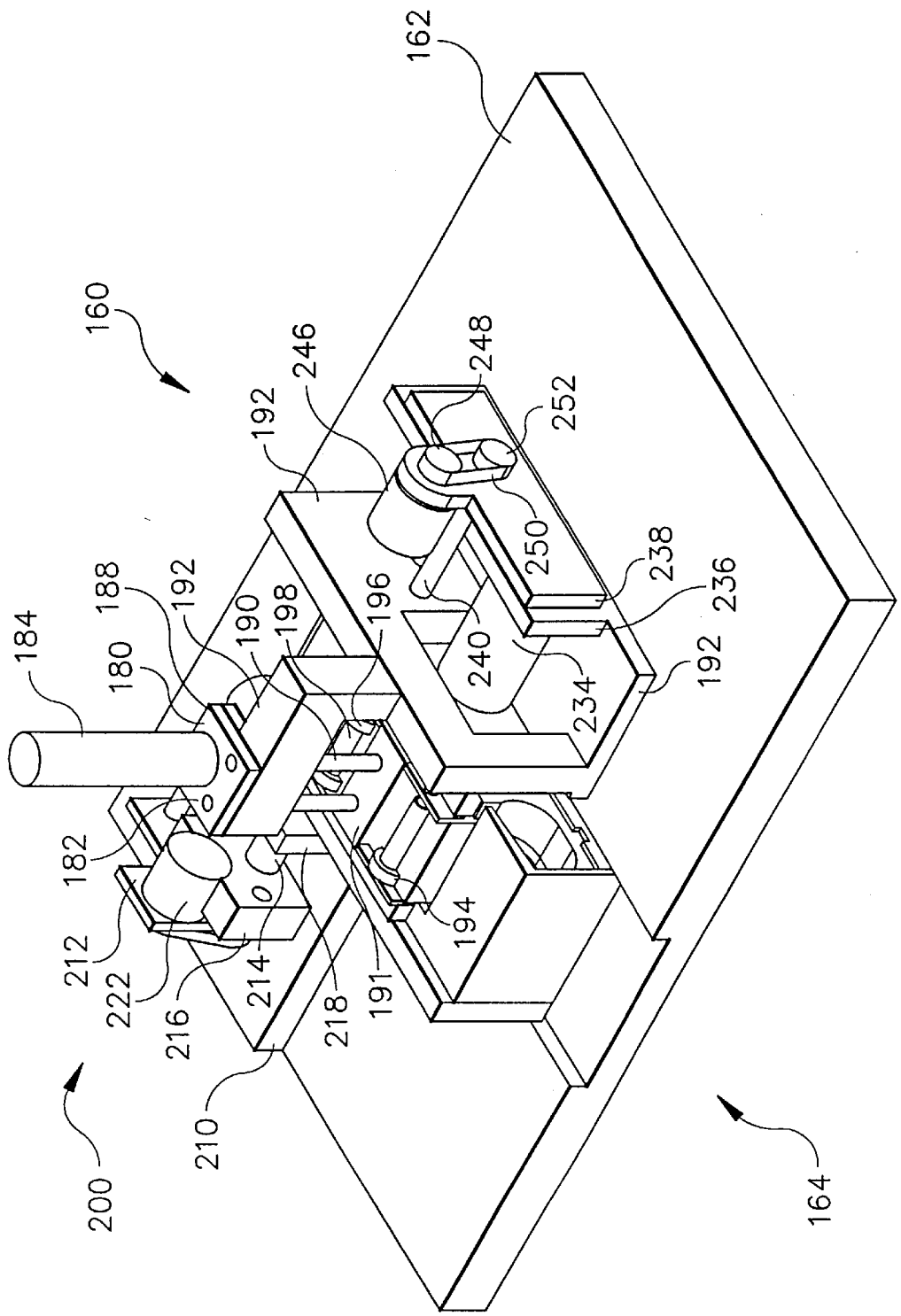
FIG. 11 is a partial elevational view of the assembly fixture shown in FIG. 10, rotated by 180 degrees, showing the engagement of a film transport mechanism which permits prewinding of a filmstrip from a thrust type film cartridge into a film roll chamber of the camera body section.

A second embodiment of the present invention is herein described with reference to FIGS. 10–11. For the sake of clarity, similar parts will be identified where appropriate by reference numerals used in the preceding embodiment.

In this embodiment, the prewinding can take place directly within a camera body section 16 rather than having to prewind the film in separate chambers provided in an assembly fixture. Referring specifically to FIGS. 10 and 11, an assembly fixture 160 includes a base 162 having a slotted portion 14 defining a film winding station 164, the slotted portion being sized to accommodate a fitted camera body section 16, inserted in the slotted portion with the open rear side 20 facing upwardly.

As previously described, the camera body section 16, FIG. 3(a) and 3(b), includes a pair of cavities 22, 24 for receiving a film cartridge 34 and a film roll carrier 36, FIG. 4, respectively. The cavities 22, 24 include open sides 25, 27 in the rear side 20, and open ends 21, 23 in the bottom surface 42 of the body section 16 for accommodating the film cartridge 34 and film roll carrier 36. In this embodiment, the body section 16 also includes a thumbwheel 161 which is mounted to the top surface 41 and includes a drive engagement portion (not shown) within the cavity 22 which engages the drive access 37 of the rotatable film spool 45, FIG. 3(c). A hole 163 in the thumbwheel 161 allows access to the drive access by a cartridge engagement shaft end 220, FIG. 10, as described below to thrust film from the cartridge 34.

A film transport mechanism 180 includes an actuator 182, similar to those previously described comprising a drive cylinder 184 having an interior sized for containing a drive shaft 186 which is translated by rotation of the cylinder 184. The cylinder 184 is mounted to a base 188 having also secured thereto a pair of depending output shafts 190. When the cylinder 184 is rotated, the output shafts 190 are caused to translate vertically with the base 188 which is displaced relative to a support 192 to which the actuator 182 is fixed. The ends of the output shafts 190 are attached to a horizontal plate 191 having pairs of openings 194 oppositely situated from the shafts through which extend an engaging portion of a set of rollers 196. The rollers 196 are secured to a pair of axles 198, forming two roller pairs.

A cartridge engagement mechanism 200 adjacent to the film winding station 164 includes an engagement actuator 202 comprising an engagement cylinder 204 having an interior sized for containing a rigid and attached drive shaft 206 which can be drawn into and out of the interior when the cylinder is rotated, in a manner which is known and previously described.

The engagement cylinder 204 is secured to an actuator base 208 secured to a planar support member 210, attached to the assembly base 162. The drive shaft 206 is attached at its remaining end to a translatable plate 212. A parallel output shaft 214 is also attached at one end to the translatable plate 212 and horizontally extends from the plate 212 toward the slotted portion 14 and a fitted camera body section 16 through holes (not shown) defined in supports 216, 218, the supports extending upwardly from the planar support member 210. The output shaft 214 has an engaging end 220 for engaging the cartridge film spool 45 of a cartridge 34 inserted into the camera body section 16 through the thumbwheel hole 161.

A motor 222 is attached to the translatable plate 212 having an output shaft 224 which extends through the translatable plate 212 and is connected at its end by a pinion 226. The motor pinion 226 is attached to a second pinion attached to the end of the shaft 214 through the translatable plate 212, and both pinions are interconnected by a drive belt 230 which allows the shaft 214 to rotate when the motor 222 is activated.

A light lock engagement and cartridge loading mechanism 230 is located oppositely from the cartridge engagement mechanism 200 relative to the film winding station 164, and includes an actuator 232 comprising a drive cylinder 234 having an interior sized for containing a rigid and attached drive shaft (not shown) which can be driven into and out of the interior when the drive cylinder is rotated in the manner previously described.

The drive cylinder 234 is fixedly attached to an extending base portion 236 of the support 192 which is secured to the assembly base 162. The drive shaft is attached at its free end to a translatable plate 238. Two parallel output shafts 240 and 242 are also attached to the translatable plate 238 and extend horizontally from the plate 238 toward the slotted portion and particularly toward the chambers 22 of a camera body section 16 fitted to the assembly fixture 160 through holes (not shown) defined in the base portion 236 of the support 192 and the support. Each of the output shafts 240, 242 have engaging ends (not shown) for engaging the light lock 46 and the rotatable film spool, respectively, of cartridge 34 loaded in the chamber 22.

A motor 246 is attached to the translatable plate 238 having an output shaft (not shown) which extends through the translatable plate 238 and is connected at its end to a pinion 248. The motor pinion 248 is interconnected to a second pinion 252 attached to the output shaft 240 for engaging the light lock 45, FIG. 3(c), by a drive belt 250 to provide drive engagement to rotate the shaft and open the light lock.

In operation, and in a darkroom, the camera body section 16 is loaded in any convenient manner into the slotted portion 164 of the assembly base 162. The body section 16 is aligned along the slotted portion 14 so that the cartridge engagement mechanism 200 and the light lock engagement and cartridge loading fixture 230 are aligned with the cartridge cavity 22.

In this embodiment, a camera body section 16 is loaded into the assembly fixture 160 already having a thrust type film cartridge 34 and a film roll carrier 36 or using a conventional film roll chamber (not shown) which is positioned in cavities 22, 24. In lieu of the above, the cartridge can alternately be loaded into the cavity 22 of the camera body section using the fixture 230 by rotating the drive cylinder 234 in a counterclockwise direction, translating the plate 238 and the cartridge loading shaft 242 horizontally, translating the cartridge shaft axially into engagement with the cartridge 34 and guiding the cartridge into the cavity 22 through the open end 21, FIG. 2 from a preload position (not shown). The cartridge loading shaft 242 remains in engagement with the cartridge 34 along with the light lock engaging shaft 240 with the light lock 46 of the film cartridge during film prewind.

The film cartridge 34 is fully introduced into the cavity 22 until the drive access 37 of the rotatable film spool 46 FIG. 3(c) has been engaged by the drive member which extends from the thumbwheel 161 into the cavity 22 in which the thumbwheel has already been mounted to the top surface 41 of the camera body section 16 according to this embodiment. As noted, the thumbwheel 161 includes a drive opening or hole 163 which is sized to receive the engaging end 220 of the cartridge spool engaging shaft 214. The cartridge spool engaging shaft 214 is then translated into position with the drive opening 163 by the counterclockwise (according to FIG. 10) rotation of the drive cylinder 204 which translates the drive shaft 206 and the plate 212 toward the film winding station 164. Due to the interconnection of the cartridge spool engaging shaft 214 with the plate 212, the shaft 214 is caused to translate until the engaging end 220 is fully engaged with the drive opening 163.

The film transport assembly 180 is moved vertically into engagement with the camera body section 16 by rotating the drive actuator 184 in a counterclockwise direction, drawing the drive shaft 186 into the interior of the cylinder. The drawing of the drive shaft 186 into the cylinder causes the base 188 to translate vertically along with the output shafts 190 downward toward the exposure portion 26 of the camera body portion 16 until the engaging portions of the rollers 196 contact the film rails 28, 30.

The light lock 46 of the film cartridge 34 is opened by activating the motor 246 which rotates the light lock opening shaft 240, including the engaging end (not shown, but similar to that shown in FIG. 3(c), which is engaged with the light lock 46, in a clockwise direction, opening the film exit door 49, FIG. 3(c). The film cartridge 34 is now in a condition which allows the thrusting of the filmstrip 44.

Activation of the motor 222 causes rotation of the cartridge spool engaging shaft 214 in a film unwinding direction causing the leader portion 43, FIG. 8, of the filmstrip 44 to be thrust from the cartridge where the leader portion is supported by the film rails 28, 30. A sensor element (not shown) mounted to the horizontal plate 191 adjacent the film exit door 49 of the cartridge 34 senses the presence of the leader portion 43 as it passes beneath the sensor, activating the motor (not shown), which rotates the rollers 196 in a film unwinding direction, pulling film from the confines of the cartridge 34.

The rollers 196 rotate in a counterclockwise direction, according to the convention shown advancing the filmstrip 44, FIG. 8, across the film rails 28, 30 and into the film roll carrier 36 of the camera body section 16. As noted above, the film roll carrier 36, described in the preceding embodiment, is placed in the camera body section 16 though a conventional film roll chamber having a roll core, a take-up spool, or other roll forming means such as those found in conventional cameras can be used. In this embodiment, the film roll carrier 36 winds the unexposed filmstrip 44 as the filmstrip enters a film access slot 56 and is then forms an unexposed film roll against and between the inner convolute surfaces of a guide wrap member 54, and inner wall 52.

As previously shown, and referring generally to FIG. 9, the camera body section 16 can then be moved along the slotted portion 14 to a separate station for placement of a lighttight rear cover 154. The assembled camera can then be removed from the assembly fixture 160, and the darkroom.

It should be readily apparent that the camera body section 16 can be provided with a recyclable carrier 24, such as described above, or be provided with a conventional film roll chamber.

It should also be readily apparent that though the preceding discussion related only to thrust-type film cartridges that conventional cartridges having protruding leader portions can also utilize a roller assembly as described to prewind film into a film roll chamber or a film roll carrier, as described.

The invention has been described with reference to a preferred embodiment. However, it will be appreciated that variations and modifications can be effected by a person of ordinary skill in the art without departing from the scope of the invention. For example, though this invention is described with respect to single-use cameras, it should be readily apparent that the teachings herein should not be so limited.

I claim:

1. A non-lighttight carrier for an unexposed film roll, comprising:

a body having three closed sides and an open side, said body having at least one open end, said body having a curved inner wall, said body having a plurality of external, longitudinally extending rib members joined to respective said closed sides; and a convolute, flexible guide member joined to said body, said guide member being disposed in said open side, said guide member and said body defining a space for said film roll and a film access slot in said open side.

2. The carrier of claim 1 wherein said inner wall has a slot and said guide member is inserted in said inner wall slot.

3. The carrier of claim 2 wherein said body has two open ends.

4. The carrier of claim 1 wherein said body has two open ends.

5. A camera comprising:

a body section having a cavity, said cavity having an axial opening; and a non-lighttight film roll carrier disposed in said cavity, said carrier engaging said body section, said carrier including a body having three closed sides and an open side, said body having an open end facing said axial opening, said body having a curved inner wall, said inner wall having a slot; and a convolute, flexible guide member inserted in said inner wall slot, said guide member being disposed in said open side, said guide member and said body defining a film exit slot.

6. The camera of claim 5 wherein said body has a plurality of external, longitudinally extending rib members joined to respective said closed sides; and said camera body section has a plurality of slots engaging corresponding said rib members.

7. The carrier of claim 6 wherein said inner wall has a slot and said guide member is inserted in said inner wall slot.

8. The carrier of claim 7 wherein said body has two open ends.

9. The carrier of claim 5 wherein said inner wall has a slot and said guide member is inserted in said inner wall slot.

10. The carrier of claim 5 wherein said body has two open ends.

* * * * *